Dec. 12, 1967     R. L. WOLFRUM     3,357,245

SYSTEM FOR VOLUMETRIC ANALYSIS

Filed April 14, 1965     2 Sheets-Sheet 1

INVENTOR
RICHARD L. WOLFRUM
BY
ATTORNEYS

Dec. 12, 1967          R. L. WOLFRUM          3,357,245
SYSTEM FOR VOLUMETRIC ANALYSIS
Filed April 14, 1965                    2 Sheets-Sheet 2

INVENTOR
RICHARD L. WOLFRUM
BY,
ATTORNEYS

United States Patent Office 3,357,245
Patented Dec. 12, 1967

3,357,245
SYSTEM FOR VOLUMETRIC ANALYSIS
Richard L. Wolfrum, Inglewood, Calif., assignor to Acoustica Associates, Inc., Los Angeles, Calif., a corporation of New York
Filed Apr. 14, 1965, Ser. No. 448,032
14 Claims. (Cl. 73—290)

This invention relates to a system for measuring the volume of material within a storage space, and more particularly to a new and improved system for gauging the contents of a container by the adiabatic compressibility of gas in the ullage volume.

The invention described herein is an improvement over the system described in application Ser. No. 230,866 filed Oct. 16, 1962, now Patent No. 3,237,451 dated Mar. 1, 1966.

In measuring the amount of liquid stored within a chamber, such as a tank, one general method is to sense the position of the surface of the liquid. Liquid level sensors may take a number of different forms, as for example, floats or depth gauges. In addition, certain acoustical devices have been employed in the past for this purpose. For example, an acoustical signal can be reflected by the surface of a liquid in a tank from a sending transducer to a receiving transducer. By measuring the time of transit of the acoustical signal, an accurate indication of the position of the surface from the two fixed transducers may be determined. The level thereby determined then need only be related to the geometry of the filled portion of the tank to determine the stored volume.

Where a measurement is based upon the position of a liquid surface, a careful calibration is first made to ascertain the exact relation between level and volume. Even with accurate calibration, however, serious deviations from true volume can result from certain unknown factors, such as a meniscus effect resulting in convex or concave surfaces. The degree of surface curvature caused by surface tension or capillary action can be quite large where certain liquids are involved or where the diameter of the storage tank is relatively narrow at the surface level. Accuracy under these conditions depends to a great extent upon where the surface level is measured, since the surface level at the container walls will be higher or lower than at the center.

Where the material stored is a solid, determinations of volume based upon the level within the storage tank are, at best, only close approximations. Even a fine granular solid substance does not form a smooth surface or predictable surface configuration.

In many instances the problems of volume determination caused by surface irregularity and container shape can be avoided by employing another general volume measurement method wherein the weight of the material stored is ascertained and related to its specific weight to obtain volume. The accuracy of this method depends upon the accuracy of the value used for the specific weight which may differ considerably with separate batches of a given material and with changes of temperature. Furthermore, where large storage capacities are involved, weighing the entire container and its contents may be impractical.

Both of the prior general volume measurement methods require that the material and the storage facility be maintained under fairly static conditions. Violent accelerations do not allow a static level to be established nor can a proper weighing be carried out under transient conditions. Accelerational differences encountered where the storage device is contained within a moving vehicle make volume measurements by the above described methods even more difficult, if not impossible.

The problem of volumetric measurement is particularly acute in accurately measuring quantities of liquid in a zero-gravity environment due to an irregular and changing shape of the volume occupied by the liquid.

Pockets of liquid and gas may be interspersed throughout the storage chamber, thus preventing accurate measurement of stored material by the methods described above.

In principle, a simple pressure measuring device can be used to find the magnitude of a volume of any shape. By providing a fixed quantity of gas within the container, the pressure in the gas-filled portion can be measured to determined volume. The pressure is inversely proportional to the gas volume for a constant quantity of gas at constant temperature. Therefore, the pressure measurement determines the gas volume of the container, and the liquid volume can then be determined where the total tank volume is known. However, since the gas quantity and the temperature are not constant, this method becomes impractical or very inaccurate.

In accordance with the present invention it has been found that with an appropriate arrangement of acoustical passages connected with a container, sound waves introduced therein will show phase differences at various points in the passages that can be sensed and electronically processed to give an accurate and continuous measurement of container contents. One particular advantage in this is that the only required moving parts are the vibratory motions of the acoustic transducers. Acoustic transducers of the preferred type utilized operate with virtually no frictional contact and as a result are substantially impervious to wear. Thus it is an object of the invention to define a volumetric gauging concept of increased precision and reliability.

It is a further object of the present invention to provide a system for making volumetric measurements within a storage container under a large variety of external conditions.

Another object of this invention is to provide an acoustical system for measuring the volume of a stored material, the system being relatively free from inaccuracies produced by vibratory conditions or noise.

A still further object of this invention is to provide an accurate system for measuring the volume of a liquid contained within an irregularly shaped container.

Still another object of this invention is to provide a volumetric measuring arrangement for accurately determining the volume of an enclosed liquid having an irregular and indefinite shape at the liquid-gas interface.

Another object of this invention is to provide an acoustic pressure method of determining the volume of a material within a container where the gas quantity and temperature are variable.

Yet another object of this invention is to gauge the contents of a container by phase comparisons of acoustical waves introduced into the container and associated acoustical passages.

Various other objects and features will be apparent from the following description of the invention taken together with the drawings in which.

Essentially, the inventive system comprises a primary volume to be measured, an acoustical resistance connecting the primary volume to a secondary volume containing a first acoustical driving device. A first pair of pressure sensitive transducers sense the pressure in the primary volume and in the secondary volume. The phase difference between the signals developed in the first pair of transducers is detected as a voltage amplitude. The phase difference between the signals developed in a second pair of transducers associated with reference primary and secondary volumes and a second acoustical driving device is detected as a voltage amplitude and the two voltage amplitudes are compared. The first acoustical driver is driven at a fixed frequency and the second acoustical driver is varied in frequency in accordance with the comparison of the phase-difference signals available from the two pairs of transducers so that the difference between these latter two signals approaches zero. It will be seen that the frequency of the second acoustical driver will become an indication of the primary volume where the other three volumes and the separating acoustical resistances are maintained fixed.

Figure 1:
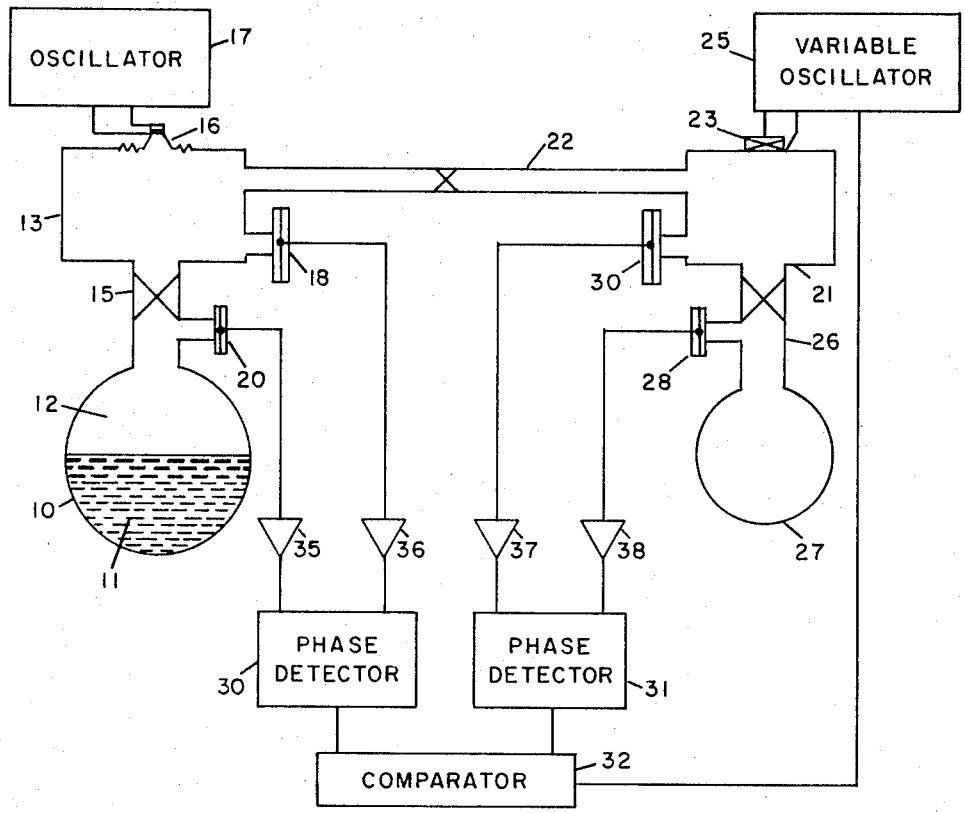
FIG. 1 is a diagrammatic illustration of the invention.

Referring now to FIG. 1, tank 10 contains a volume of material 11. Tank 10 also contains ullage volume 12. Tank 10 is connected to a secondary cavity 13 by acoustical passage 15. This passage comprises an acoustical resistance denoted by the X across the passage. The acoustical resistance can be, by way of example, a small diameter tube, a fine mesh screen or a screen of sintered material. Suitable resistance values for a specific embodiment are readily obtainable by selecting the open area and path length of the element.

Acoustical driver 16 coupled to cavity 13 will vary in design depending on the size of the tank. Generally these frequencies will be quite low in the order of less than 100 cycles per second. The preferred frequencies are governed by the following relations:

(1) In a tank not exposed to zero gravity conditions $$f \ll c/l$$

where:

$f$=frequency, cycles per second
$c$=speed of sound in the gas, feet per second
$l$=longest tank dimension, feet (2) In a tank which may be exposed to zero gravity conditions wherein the contents may be randomly distributed including vapor pockets:

$$f \leq \frac{3\sqrt{3}}{4\pi} \times \frac{1}{l} \times \sqrt{M} \times \frac{\sqrt{\gamma P}}{\rho}$$

where:

$M$=allowable error, e.g. 0.01 for 1%
$P$=tank pressure, lbs./ft.$^2$
$\rho$=liquid density, lbs./ft.$^3$
$\gamma$=ratio of specific heats of the gas $C_p/C_v$ (the specific heat at constant pressure/the specific heat at constant volume)

With a drive frequency below 3 cycles per second, a motor and bellows arrangement would perhaps operate most effectively as a driver. However it is expected that the greatest utilization would be with drive frequencies above 3 cycles per second and an electrodynamic type of driver similar to those used for loudspeakers can be used. With very small tanks and where high static pressures are involved, a piezoelectric driver can be used. Other factors will influence the choice of drivers. The only important factors, as far as system operation is concerned, are that the driver produce a sinusoidal volume displacement large enough to create a usable signal pressure level and maintain the frequency constant to within the system gauging accuracy requirement.

Driver 16 is operated by fixed frequency electronic oscillator 17. First pressure sensitive transducer 18 attached to cavity 13 registers the sound waves introduced by acoustical driver 16. Second pressure sensitive transducer 20 attached to tank 10 registers the sound waves in the tank.

The pressure sensitive transducers are suitably any form of pressure sensing transducer that will convert the pressure variations to electrical signals. Flexure mode piezoelectric transducers have been found to work well and may be either clamped-edge type or nodal ring mounted. The fundamental frequency of the transducer generator and diaphragm determines the upper frequency limit for flat frequency and phase response. How close the system can operate to this resonant frequency is determined by the application. The current application allows operation below one one-hundredth of the resonant frequency. The lower frequency of operation for flat response is determined by the capacitance of the generator element of the transducer and the value of the input DC resistance of the amplifier to which it is connected. The source impedance or capacitive reactance of the generator element becomes higher as the frequency is reduced. The current design has no significant phase error with an amplifier input resistance of thirty megohms or higher. This is easily obtained with field effect transistors and will be even easier when insulated gate field effect transistors are commercially available.

Cavtiy 13 is connected to reference cavity 21 by acoustically resistive passage 22. The purpose of passage 22 is to assure static equilibrium both as to pressure and nature of gaseous content between cavities 13 and 21. Passage 22 could equally well be connected between any other part of the primary system and any part of the reference system. Reference cavity 21 can be wall-to-wall with cavity 13 in which case passage 22 can be a small aperture between the two, or an aperture across which a fine mesh screen is fitted. Acoustical driver 23 is coupled to cavity 21 for introducing sound waves therein. Acoustical driver 23 is depicted as a piezoelectric transducer, but may also be electrodynamic or other type provided it is adapted to operate with a variable frequency. Driver 23 is operated by a variable electronic oscillator 25.

Reference cavity 21 is connected by acoustical resistance 26 to reference volume 27. The volume of the passages, connections and the reference volume are kept small relative to tank 10. However, the acoustical reactance of the reference volume is compensated for by the use of a higher value of acoustical resistance, 25, compared to acoustical resistor 15.

Pressure sensitive transducer 28 coupled to reference volume 27 and pressure sensitive transducer 30 coupled to reference cavity 21 sense the sound waves from driver 23. These transducers are similar to transducers 18 and 20 of the primary system.

In one arrangement bimorph elements have been used in which one half of the bimorph element is a metal diaphragm and the other half is a piezoelectric transducer element. Another type of suitable pickup transducer design is obtained by mounting a strain gauge at the center of a diaphragm which measure the strain produced by the signal pressure. The advantage of such a transducer is that it presents a constant low, resistive source impedance to the electronic circuit. A conventional piezoelectric or electrodynamic transducer presenting a less desirable source impedance to following circuits will tend to introduce phase errors in the output dependent on loading. With a strain gauge output loading of the transducer will affect amplitude but not phase.

The output signal from transducer 18 representative of the sound waves in secondary cavity 13 is compared in phase with the output signal from transducer 20 representative of the sound waves in primary volume 12. This phase comparison is performed by phase detector 30 which produces a voltage proportional to the phase shift. Phase detector 31 connected to transducers 30 and 28 performs a similar function for the reference system. Phase detectors 30 and 31 are connected to a comparator 32 which uses the difference in the phase detector outputs to vary the frequency of variable oscillator 25 so as to minimize said difference.

Figure 2:
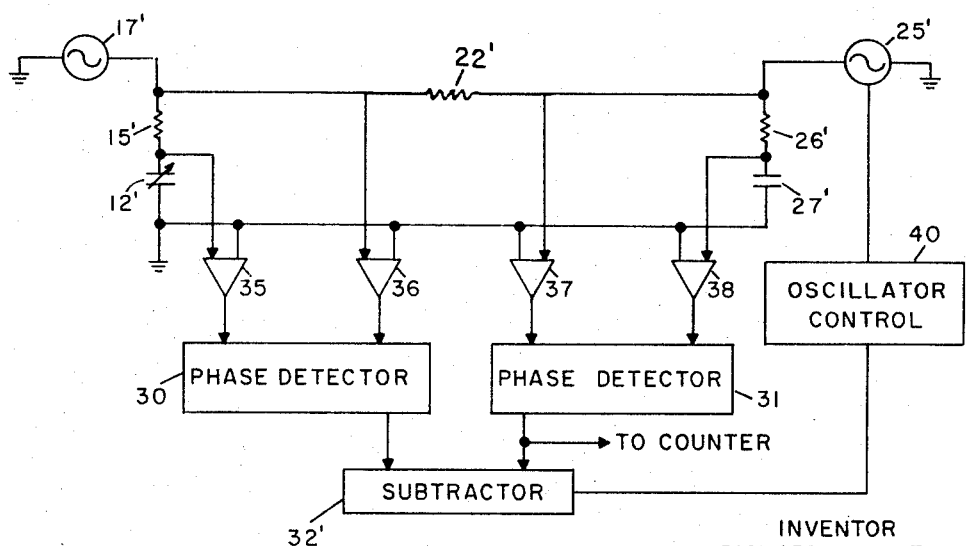
FIG. 2 is a diagram of an electrical analogy of the invention.

The function of the system described above and illustrated in FIG. 1 will be more readily explained after describing the electronic analogue illustrated in FIG. 2. For ease of comparison, the components of the electrical analoque in FIG. 2 are given the same reference numbers as the analogous components in FIG. 1. Thus the primary volume otherwise described as the ullage volume 12 of tank 10 is analogous to variable capacitor 12' in FIG. 2. The variability of capacitor 12' is indicative of the volume change as the tank empties. Acoustical resistance 15 FIG. 1 is nalogous to isolating resistor 15' in FIG. 2. It is apparent that transducers in the form of acoustical drivers and pressure sensors are unnecessary in the all electrical analogue since there are no mechanical electrical transitions or vice versa.

Static equilibrium is assured by connecting the primary and reference systems through an equalizing resistance, 22'. Oscillator 25 in FIG. 1 is analogus to oscillator 25' in FIG. 2 connected to resistor 26'. Acoustical resistance 26 in FIG. 1 is analogous to resistor 26' in FIG. 2. Resistor 26' is connected to fixed reference capacitor 27' analogous to reference volume 27 of FIG. 1.

Pickup connection made on either side of resistor 15' are connected to clipper amplifiers 35 and 36. These amplifiers are in turn connected to phase detector 30 which detects the difference in phase of the electrical signals on the opposite sides of resistor 15'. Pickup connections made on either side of resistor 26' are connected to clipper amplifiers 37 and 38. These amplifiers are in turn connected to phase detector 31. Phase detectors 30 and 31 are connected to subtractor 32' which is analogous to comparator 32 of FIG. 1. The subtractor is in turn connected to a control network 40 which varies the frequency of oscillator 25'.

Consider first the operation of the electrical analogue, FIG. 2. As the voltage from oscillator 17' rises, it will appear first across resistor 15' and then, as capacitor 12' charges, it will appear across capacitor 12'. Thus there is a phase lag in the voltage appearing across capacitor 12' compared to that across resistor 15'. It is apparent that with successively larger capacity ranges for capacitor 12', the frequency of oscillator 17' must be lower so that the capacitor achieves a significant charge before the voltage swings in the opposite direction. The voltage detected across resistor 15' and the voltage detected across capacitor 12' are amplified by amplifiers 36 and 35 respectively and the difference in phase between them is detected by phase detector 30. With a fixed frequency and fixed resistance, the phase difference will increase with increasing capacity.

The operation of the reference system consisting of oscillator 25', resistor 26' and capacitor 27' is similar. However in the reference system the resistance and capacitance are fixed and the frequency can be altered to vary the phase difference appearing at phase detector 31. For example, increasing the frequency will increase the phase lag of the voltage appearing across capacitor 27' as compared to that appearing across resistance 26' and vice verse. The outputs of phase detectors 30 and 31 are subtracted by subtractor 32' and the difference is used to change the frequency of oscillator 25' so as to minimize the difference. Thus the identical phase relationship is set up in the reference system as exists in the primary system by varying the frequency of oscillator 25' in the reference system as the capacity of capacitor 12' changes in the primary system. By calibrating the frequency of oscillator 25' in accordance with the capacity of capacitor 12', the frequency of oscillator 25' will be an accurate gauge of the capacity of capacitor 12'.

While the invention is not dependent on mathematical analyses that have been made, the operation of FIG. 1 in mathematical terms is believed to be as follows:

The acoustical operation of the gauge is based upon the theory of adiabatic compressibility of gases. One result of this theory is that the compressibility, C, of the gas within a closed volume is $V/\gamma P$ where V is the volume, P is the static pressure and $\gamma$ the ratio of specific heat of the gas at constant pressure to the specific heat of the gas at constant volume. The acoustic impedance, Z, of this volume is $1/j\omega e$ or $\gamma P/j\omega v$ where $\omega$ is the angular frequency in radians per second or $2\pi$ times the frequency in cycles per second, and $j$ is the imaginary operator indicating that the impedance is reactive and that the volume velocity into the volume and pressure rise in the volume are 90° out of phase. Another result of the theory is that a tube will be a resistance of element if the diameter is less than $$\frac{\sqrt{\eta}}{\omega e}$$

and the value of resistance, R, is $\eta l/N\pi r^4$ where $\eta$ is the coefficient of viscosity, $l$ is the path length, $r$ is the tube radius and N the total number of parallel elements.

The main tank driver causes a pressure, $\Delta P_1$, to develop in the cavity 13 ahead of the main tank resistor $R_T$ yielding volume velocity through $R_T$, into the tank volume $V_T$ resulting in a signal pressure $\Delta P_T$.

The relationship between $\Delta P_1$ and $\Delta P_T$ is the following:

$$\Delta P_T = \Delta P_1 \left( \frac{Z_T}{Z_T + R_T} \right)$$

where $P_T$ = pressure in the main tank
$P_1$ = pressure in cavity 13
$Z_T$ = acoustic impedance in the main tank
$R_T$ = main tank resistor 15

In the following equations, terms using a sub "T" are always that term as it applies to the main tank or primary system. Terms using a sub "B" are always that term as it applies to the reference system.

$$\Delta P_1 = \Delta P_T \left( \frac{Z_T + R_T}{Z_T} \right) = \Delta P_T \left( 1 + \frac{R_T}{Z_T} \right)$$

$$\Delta P_1 = \Delta P_T 1 + j \left[ \frac{\omega_T V_T}{\gamma_T P_T} \frac{\eta_T l_T}{N_T \pi r_T^4} \right]$$

From this result, the phase relation between the two signal pressures is $$\psi_T = \tan^{-1} \frac{\omega_T V_T \eta_T l_T}{\gamma_T P_T N_T \pi r_T^4}$$

where $\psi_T$ = the phase difference between $P_1$ and $P_T$.

Since the voltages out of the pickups associated with $V_1$ (cavity 13) and $V_T$ are fixed in phase with their respective signal pressures, the phase relation between these two voltages will be the same as above. The phase detector then provides an output voltage equal to $\psi_T$ as determined by the acoustic parameters in the above equation. This is a D.C. output voltage, as is explained with reference to FIGS. 3 and 4.

It is important to note that phase has been chosen as the information parameter rather than amplitude so that neither the signal pressure level nor the pickup sensitivity is critical. Also it should be noted that the volume of cavity 13, did not enter into the equations. This volume need only be large enough to house the pickup for that volume and provide clearance for the driver motion. The reference volume assembly (including the driver and pickups) may also be housed in cavity 13.

The reference half of the system consists of the same basic sections as the main tank half, therefore a similar set of equations apply. The final result from the reference phase detector is:

$$\psi_R = \tan^{-1} \frac{\omega_B V_B \eta_B l_B}{\gamma_B P_B N_B \pi r_B^4}$$

The electronic system is set up such that a feedback loop adjusts the reference volume frequency until $\psi_T = \psi_B$. Under this condition:

$$\frac{2\pi f_t V_T \eta_t l_T}{\gamma_T P_T N_T \pi r_T^4} = \frac{2\pi f_B V_B \eta_B l_B}{r_B P_B N_B \pi r_B^4}$$

The volumes $V_1$ and $V_2$ (the clearance volume next to the reference driver) and hence the volumes $V_T$ and $V_B$ have partial communication through resistive passage 22. This resistance is large enough in value to provide insolation between the signal pressures $\Delta P_1$ and $\Delta P_2$ (the pressure in reference cavity 21) but low enough in value to provide static pressure equalization and the same gas composition will then exist through the system. The resistance value will be five to ten times larger than the greatest impedance of volume $V_2$. The following equalities result:

$\gamma_T = \gamma_B$
$\eta_T = \eta_B$
$P_T = P_B$

The previous equation is simplified and rearranged to the following:

$$V_T = V_B \left(\frac{f_B}{f_T}\right) \left[\left(\frac{l_B}{l_T}\right)\left(\frac{r_T}{r_B}\right)\left(\frac{4N_T}{N_B}\right)\right]$$

The quantities in the bracket are fixed by the initial design of the acoustic resistors and can be replaced by a constant, $K_1$. Also the volume $V_B$ and the frequency $f_T$ are fixed and can be replaced by a constant $K_2$. The product of these constants can then be replaced by a constant $K$ for the system $$V_T = K_2 K_1 f_B = K f_B$$

The volume within container 10 occupied by gas is seen to be linearly related to the reference volume frequency. If liquid volume information is desired, the indicated value of gas volume is subtracted from the known value of empty tank volume.

The design value for $R_T$ is not critical but the optimum value is for $R_T = \gamma P/\omega V$, or the resistance should equal the reactance of the tank volume. This will produce the greatest change in phase for a given change of volume. The volume used in the equation should correspond to the volume where greatest resolution in gauging is desired.

The electronic circuitry would be the same for both FIG. 1 and the electrical analogue, FIG. 2.

The electronics circuits simply compare the phase difference between the two signals from the main tank pickups to the phase difference between the two signals from the reference volume pickups. If the phase difference in each case is the same, then the system is properly balanced. However, if the phase differences are not the same, then the reference volume drive frequency is caused to change by means of a feedback loop until balance is obtained.

Since the operating frequencies are so low, it is impractical to use standard phase detectors or discriminators which use transformers and relatively simple circuits. The particular means used is not important as long as it yields the desired stability and accuracy.

The first stages of electronics are simply amplifiers with the high input impedance required by the pressure sensitive transducers and also with sufficient voltage gain to convert a few millivolts to several volts required by the phase detectors. Clipper stages simply maintain the peak-to-peak voltage relatively constant regardless of fluctuations in the signal level from the pickups.

Figure 3:
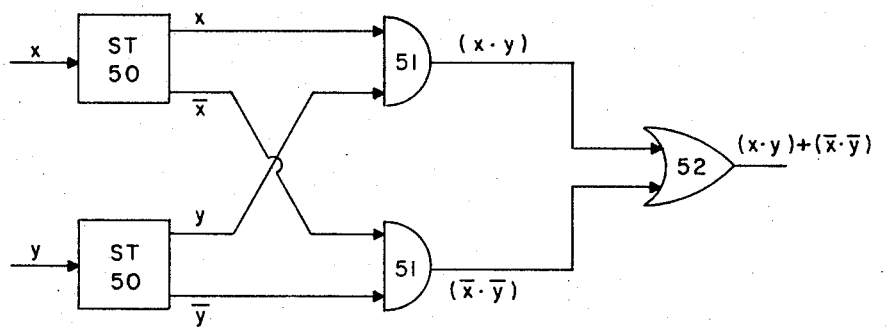
FIG. 3 is a block diagram of an exemplary phase detector operable in the invention.
Figure 4:
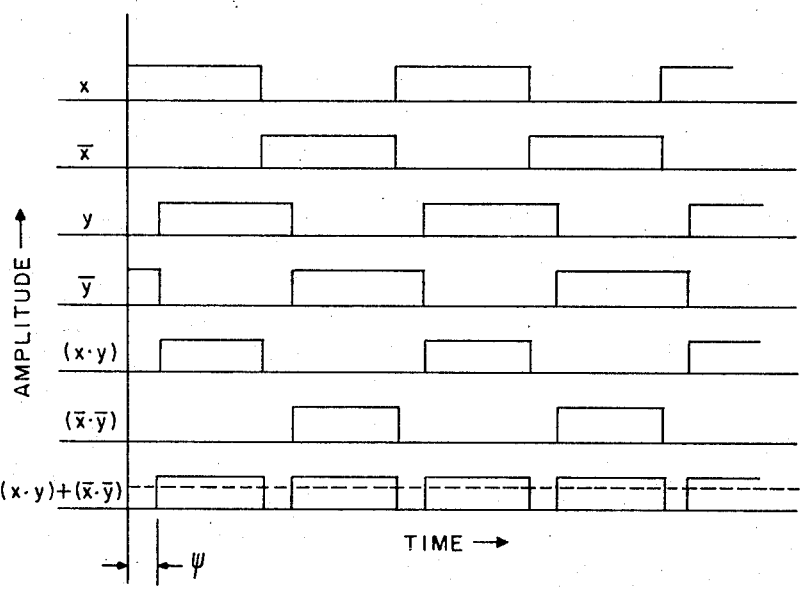
FIG. 4 is a graphical representation of the operation of the phase detector of FIG. 3 when used in the inventive system.

The phase detectors are shown in more detail in FIG. 3. The clipped sine wave is converted to a square wave. Schmidt triggers 50 are suitable since they square and also have two outputs, one in phase and one 180 degrees out of phase with respect to the input. The extra 180° signal is used by the phase detector scheme being described and is distinguished (in FIG. 3) from the in-phase signal by placing a bar over the letter representing the signal. The remainder of the phase detector consists of two "AND" gates 51 and one "OR" gate 52 which are standard in computer circuits. It should be noted that the two AND gates could be OR gates and the OR gate an AND gate and also obtain phase detection. In computer terminology the AND gate outputs are $x$ AND $y$ and $\bar{x}$ AND $\bar{y}$ while the final OR gate output is ($x$ AND $y$) OR ($\bar{x}$ AND $\bar{y}$). The average value or DC component of the output rectangular wave indicated by the dashed line in FIG. 4 is directly proportional to the phase difference between the two input signals. The average value is obtained by including and R-C integrator network (not shown) in the output of the phase detector. The time relationships are also shown in FIG. 4.

The DC level obtained from an integrator following each phase detector is subtracted by a standard difference amplifier. If the output is zero then the two phase shifts are equal and the reference volume oscillator will remain unchanged. If the phase shifts are not equal, then the difference amplifier output will activate the oscillator control and adjust the oscillator frequency until null is achieved at the difference amplifier output.

Two methods have been used in the variable oscillator and oscillator control sections. Initially a motor and gear train controlled the frequency determining resistors in the variable frequency oscillator. Currently the frequency determining resistors are field effect transistors whose resistance is controlled by the DC bias applied to the gate. The DC bias is then controlled by the output of the difference amplifier. Various other known ways for varying an oscillator in accordance with a voltage can be used.

The signal at the reference volume phase detector output which can be fed to a counter (FIG. 2) or digital to analog converter is the rectangular wave shown at the bottom of FIG. 4. It is the frequency information at this point, not the average value of the wave, that is used. The frequency could also be taken directly from the reference volume variable oscillator output. However, the figure shows that the phase detector output is double the oscillator frequency and provides a higher information rate.

What is claimed is:

1. A reactance measuring system for continuously reading a varying reactance portion of connected resistive and reactive components comprising:
   (a) a fixed frequency oscillator connected to pump said components with a sinusoidal signal;
   (b) first sensing means adapted for sensing the variations produced by said fixed oscillator across the combined resistive and reactive components;
   (c) second sensing means adapted for sensing the variations produced by said fixed oscillator across the reactive component alone;
   (d) first phase detector means connected to said first and said second sensing means for providing a direct current voltage proportional to the difference in phase of the variations sensed by said first sensing means with respect to said second sensing means;
   (e) a reference combination of resistive and reactive components;
   (f) a variable frequency oscillator connected to pump said reference combination with a sinusoidal signal;
   (g) a first reference sensing means for sensing the variations produced by said variable oscillator across the combined resistive and reactive components of said reference combination;
   (h) a second reference sensing means for sensing the variations produced by said variable oscillator across the reactive component alone of said reference combination;
   (i) second phase detector means connected to said first and said second reference sensing means adapted to provide a direct current voltage proportional to the difference in phase of the variations sensed by said first reference sensing means with respect to said second reference sensing means;

(j) subtractor means for comparing the voltage provided by said first phase detector means with the voltage provided by said second phase detector means; and, (k) oscillator control means adapted to vary the frequency of said variable oscillator in proportion to the difference between the voltages provided by said first and said second phase detector means so that said difference always approaches zero whereby the frequency of said variable oscillator is a measure of said reactance portion.

2. The method of volumetric analysis comprising:
(a) connecting a primary volume to be measured by an acoustically resistive passage to a first cavity;
(b) introducing sound waves into said first cavity so that they are coupled via said resistive passage to said primary volume;
(c) sensing the pressure variations in said primary volume by a mechanical to electrical transducer;
(d) sensing the pressure variations in said first cavity by a mechanical to electrical transducer;
(e) detecting the phase difference in the outputs of the two transducers; and,
(f) comparing said phase difference with a reference to determine a characteristic of said primary volume.

3. The method of volumetric analysis according to claim 2 in which said sound waves are at a fixed frequency and said acoustically resistive passage has a fixed resistance.

4. The method of volumetric analysis according to claim 3 in which said phase difference is detected as a first voltage having an amplitude proportional to the difference in phase and comparing said phase difference with a reference which comprises generating a second voltage having an amplitude controlled by the frequency of a variable frequency oscillator and comparing said first voltage with said second voltage whereby the difference between said first and second voltages and the frequency of said variable frequency oscillator are a measure of said characteristic.

5. A system for gauging the contents of a container by acoustically sensing the ullage volume comprising:
(a) means to introduce first sound waves into said container through a first isolating resistance;
(b) means to sense the phase shift of said first sound waves imposed by the ullage volume in said container;
(c) means to introduce second sound waves into a reference volume through a second isolating resistance;
(d) means to sense the phase shift of said second sound waves imposed by said reference volume;
(e) means to determine the difference between the phase shift imposed on said first sound waves and the phase shift imposed on said second sound waves; and,
(f) means to change the frequency of said second sound waves so that said difference approaches zero whereby the frequency of said second sound waves can be calibrated to serve as a gauge for the contents of said container.

6. A system for gauging the contents of a container according to claim 5 in which the frequency of said first sound waves is fixed, said first isolating resistance and said second isolating resistance are fixed and said reference volume is fixed.

7. A system for gauging the contents of a container according to claim 5 in which said means to introduce second sound waves is an acoustical driver powered by an electronic oscillator and said means to change the frequency is a frequency determining component of said oscillator connected to said means to determine said difference and responsive thereto to vary the frequency of said oscillator in proportion to the amplitude of said difference.

8. A gauging system for continuously reading the contents of a container by acoustically sensing the ullage volume thereof comprising:
(a) a fixed frequency acoustical driver connected to introduce sound waves into said container through an isolating resistance;
(b) first sensing means adapted to sense the variations of said sound waves prior to said resistance;
(c) second sensing means adapted to sense the variations of said sound waves in said container;
(d) first phase detector means for detecting the phase shift of the signals from said second sensing means as compared to said first sensing means;
(e) a reference volume;
(f) a variable frequency acoustical driver connected to introduce reference sound waves into said reference volume through a reference isolating resistor;
(g) first reference sensing means adapted to sense the variations of said reference sound waves prior to said reference isolating resistor;
(h) second reference sensing means adapted to sense the variations of said reference sound waves in said reference volume;
(i) reference phase detector means for detecting the phase shift of the signals from said second reference sensing means as compared to said first reference sensing means;
(j) means to determine the amplitude of the difference in the phase shifts detected by said first phase detector and said reference phase detector; and,
(k) frequency control means connected to said means to determine adapted to vary the frequency of said variable frequency acoustical driver in proportion to the difference between said phase shifts so that said difference is maintained substantially at zero whereby the frequency of the variable frequency acoustical driver can be calibrated to gauge the contents of said container.

9. A gauging system for continuously reading the contents of a container by acoustically sensing the ullage volume thereof comprising:
(a) a fixed frequency acoustical driver connected to introduce sound waves into said container through an isolating resistance;
(b) first and second sensing means for sensing the pressure waves due to said sound waves on respective sides of said resistance;
(c) first phase detector means for detecting the amplitude of the phase difference between the pressure waves as applied to said first and second sensing means;
(d) a reference volume;
(e) a variable frequency acoustical driver connected to introduce reference sound waves into said reference volume through a reference isolating resistance;
(f) first and second reference sensing means for sensing the pressure waves due to said reference sound waves on respective sides of said reference isolating resistance;
(g) reference phase detector means for detecting the amplitude of the phase difference between the pressure waves as applied to said first and second reference sensing means;
(h) a difference amplifier for determining the difference between the amplitude detected by said first phase detector and the amplitude detected by said reference phase detector;
(i) frequency control means connected to said amplifier to vary the frequency of said variable frequency acoustical driver so as to equalize the amplitudes detected by said first phase detector and said reference phase detector; and,
(j) a digital counter controlled by the frequency of said variable frequency acoustical driver calibrated for reading the contents of said container.

10. A gauging system according to claim 9 in which said digital counter is connected to said reference phase detector.

11. A system for gauging the contents of a container by acoustically sensing the ullage volume comprising:
   (a) means to introduce first sound waves into said container through a first isolating resistance;
   (b) means to sense the phase shift of said first sound waves imposed by the ullage volume in said container;
   (c) reference system means comprising a reference volume; a reference isolating resistance and means to introduce reference sound waves into said reference volume through said reference isolating resistance;
   (d) means to sense the phase shift of said reference sound waves imposed by said reference volume;
   (e) means to determine the difference between the phase shift imposed on said first sound waves and the phase shift imposed on said reference sound waves; and,
   (f) means to vary at least one parameter of said reference system so that said difference approaches zero whereby the parameters of said reference system can be used to gauge the contents of said container.

12. A system for gauging according to claim 11 wherein said means to sense phase shift in each case comprises means to convert the angular phase shift to a direct current voltage having an amplitude proportional to the degrees of shift.

13. A system for gauging according to claim 12 wherein said means to determine the difference is a subtractor which subtracts the voltage proportional to the phase shift imposed upon one of said first sound waves and said reference sound waves from the voltage proportional to the phase shift of the other.

14. A system for gauging according to claim 13 wherein said one parameter is the frequency of said means to introduce reference sound waves and said means to vary is means controlled by said subtractor to vary said frequency.

References Cited

UNITED STATES PATENTS

| 2,666,326 | 1/1954 | Poole et al. | 73—149 |
| 2,851,658 | 9/1958 | Howson | 324—83 |
| 3,191,431 | 6/1965 | Schloss | 73—67.1 |

LOUIS R. PRINCE, *Primary Examiner.*

D. M. YASICH, *Assistant Examiner.*